United States Patent
Suk et al.

(10) Patent No.: US 10,208,151 B2
(45) Date of Patent: Feb. 19, 2019

(54) METHOD FOR PREPARING LARGE-SIZE DIENE-BASED RUBBER LATEX AND ACRYLONITRILE-BUTADIENE-STYRENE GRAFT COPOLYMER COMPRISING THE SAME

(71) Applicant: LG CHEM, LTD., Seoul (KR)

(72) Inventors: Jae Min Suk, Daejeon (KR); Young Min Kim, Daejeon (KR); Jin Hyoung Lee, Daejeon (KR); Su Jeong Han, Daejeon (KR); Yoo Vin Kim, Daejeon (KR); Young Hwan Jeong, Daejeon (KR); Sun Haeng Chung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/533,631

(22) PCT Filed: Dec. 10, 2015

(86) PCT No.: PCT/KR2015/013541
§ 371 (c)(1),
(2) Date: Jun. 6, 2017

(87) PCT Pub. No.: WO2016/093649
PCT Pub. Date: Jun. 16, 2016

(65) Prior Publication Data
US 2017/0327619 A1    Nov. 16, 2017

(30) Foreign Application Priority Data
Dec. 11, 2014 (KR) .................. 10-2014-0178743

(51) Int. Cl.
| C08F 279/04 | (2006.01) |
| C08F 36/04 | (2006.01) |
| C08F 2/22 | (2006.01) |
| C08F 2/44 | (2006.01) |
| C08K 5/053 | (2006.01) |

(52) U.S. Cl.
CPC .............. *C08F 279/04* (2013.01); *C08F 2/22* (2013.01); *C08F 2/44* (2013.01); *C08F 36/04* (2013.01); *C08K 5/053* (2013.01)

(58) Field of Classification Search
None
See application file for complete search history.

(56) References Cited

U.S. PATENT DOCUMENTS

| 2004/0192843 | A1 | 9/2004 | Chai et al. | |
| 2005/0239962 | A1* | 10/2005 | Yoo ................. | C08F 279/02 525/71 |
| 2006/0079649 | A1* | 4/2006 | Jung ................. | C08F 2/22 525/301 |
| 2006/0211817 | A1 | 9/2006 | Cha et al. | |
| 2009/0118393 | A1 | 5/2009 | Yoo et al. | |
| 2010/0152365 | A1 | 6/2010 | Han et al. | |
| 2011/0229646 | A1* | 9/2011 | Kim ................. | C08F 236/12 427/385.5 |
| 2014/0378576 | A1 | 12/2014 | Jung et al. | |

FOREIGN PATENT DOCUMENTS

| CN | 101747542 A | 6/2010 | |
| CN | 104603169 A | 5/2015 | |
| EP | 2404941 A1 * | 1/2012 | ............ C08F 220/18 |
| EP | 2404941 A1 | 1/2012 | |
| KR | 10-1994-0009221 A | 5/1994 | |
| KR | 10-0179314 B1 | 5/1999 | |
| KR | 10-2002-0036556 A | 5/2002 | |
| KR | 10-2007-0043478 A | 4/2007 | |
| KR | 10-0806123 B1 | 2/2008 | |
| KR | 10-2011-0065019 A | 6/2011 | |
| KR | 20110065019 A * | 6/2011 | ............... C08F 2/44 |
| KR | 10-1223295 B1 | 1/2013 | |
| WO | 03/044069 A1 | 5/2003 | |
| WO | 2004/096909 A1 | 11/2004 | |
| WO | WO 2014/058163 A1 | 4/2014 | |

OTHER PUBLICATIONS

Machine translation of KR-20110065019, translation generated Jul. 2018, 31 pages. (Year: 2018).*
International Search Report for PCT/KR2015/013541 filed on Dec. 10, 2015.
Extended European Search Report for European Application No. 15867451.5 dated Nov. 17, 2017.
"XP-002775287", Database WPI, Week 200762, 2017, Thomson Scientific, London, GB.

* cited by examiner

*Primary Examiner* — Robert S Loewe

(57) ABSTRACT

The present invention relates to a method for preparing a diene-based rubber latex having improved impact strength, gloss and flexibility, diene-based rubber latex prepared therefrom, and an acrylonitrile-butadiene-styrene graft copolymer having improved impact strength and production yield while having reduced rubber solid content ratio by comprising the same.

19 Claims, No Drawings

METHOD FOR PREPARING LARGE-SIZE DIENE-BASED RUBBER LATEX AND ACRYLONITRILE-BUTADIENE-STYRENE GRAFT COPOLYMER COMPRISING THE SAME

CROSS-REFERENCE TO RELATED APPLICATION

This application is a National Phase of International Application No. PCT/KR2015/013541, filed Dec. 10, 2015 which claims priority of Korean Patent Application No. 10-2014-0178743, filed on Dec. 11, 2014, which is hereby incorporated by reference in its entirety.

TECHNICAL FIELD

The present invention relates to a method for preparing large-size diene-based rubber latex having improved impact strength by controlling the type of a cross-linking agent and the time point of addition thereof, large-size diene-based rubber latex prepared therefrom, and an acrylonitrile-butadiene-styrene graft copolymer and a thermoplastic resin having improved impact index, gloss and flexibility while having reduced solid content in the copolymer latex by comprising the same.

BACKGROUND ART

In general, an acrylonitrile-butadiene-styrene (hereinafter, called 'ABS')-based resin is widely used to electricity, electronic parts, office machines, car parts and the like due to its relatively good properties such as impact resistance, mechanical strength, moldability, gloss and the like.

As a method for preparing it, there is a method of conducting solution polymerization by dissolving rubber resin in monomer solution, or a method of preparing rubber latex using a diene-based monomer and conducting graft copolymerization by subjecting styrene and an acrylonitrile monomer to emulsion polymerization using thereof and the like. Commercially, the latter emulsion polymerization method is much used because it has advantages that it is easy to modify recipe according to quality level preferentially required and it can prepare various product families when extruding a product produced in the powder form and then mixing thereof with various matrix resins (PSAN, PC, PBT, PVC and the like) and additives (flame retardant, weather resistant stabilizer, antistatic agent, antibiotic and the like).

In preparing the ABS resin by this emulsion polymerization method, as mentioned above, the diene-based rubber latex is used to improve impact resistance. A commercially important part when preparing this diene-based rubber latex is i) an aspect of production efficiency and ii) securement of rubber latex properties (particle diameter, gel content) for effectively securing impact resistance of the ABS.

First of all, i) in the aspect of production efficiency, a general method for preparing a diene-based rubber latex has disadvantages that polymerization reaction should be usually conducted for 30 hours or longer to obtain large size, and polymerization conversion rate is little improved even though consuming more time because the polymerization conversion rate is rapidly reduced at the polymerization conversion rate of 90% or higher. In order to overcome this, in the case of conducting the polymerization under conditions of shorter reaction time and higher reaction temperature, there is a problem of reduced particle diameter and increased reaction coagulates, and also reaction pressure is increased by excess reaction heat thereby safety is low during mass production process. Thus, it is commercially difficult to obtain the large size polybutadiene latex having high conversion rate in a short reaction time.

Further, ii) in the securement of rubber latex properties for securing impact resistance of the ABS, particle diameter and gel content generated by internal cross-linking are largely recognized as important factors. For example, it is known that in general, in order to effectively secure impact resistance, the large-size rubber latex (3000 Å or higher) is more advantageous than small-size particle, and the rubber latex having lower gel content is more advantageous than the rubber latex having higher gel content. However, under the conditions of short reaction time and high conversion rate, the rubber latex having small particle diameter and high gel content is usually prepared. Thus, there are many difficulties in effectively securing rubber latex properties.

Accordingly, many companies are trying various methods for securing properties of the large-size rubber latex in consideration of productivity and properties.

DISCLOSURE OF THE INVENTION

Technical Problem

In order to solve the above problems, one object of the present invention is to provide a method for preparing large-size diene-based rubber latex having low gel content.

Another object of the present invention is to provide large-size diene-based rubber latex prepared by the method and having improved impact strength.

Further another object of the present invention is to provide an acrylonitrile-butadiene-styrene graft copolymer and thermoplastic resin, which have reduced powder content but have improved impact strength, gloss and flexibility by comprising the large-size diene-based rubber latex.

Technical Solution

In order to accomplish the objects described above, one embodiment of the present invention provides a method for preparing a diene-based rubber latex comprising:

a step of adding a conjugated diene-based monomer 50 parts by weight to 75 parts by weight, an emulsifier 1 part by weight to 3 parts by weight, a polymerization initiator 0.1 part by weight to 0.4 part by weight, an electrolyte 0.1 part by weight to 3 parts by weight, a molecular weight control agent 0.1 part by weight to 0.5 part by weight and ion exchanged water 65 parts by weight to 100 parts by weight, based on the conjugated diene monomer 100 parts by weight, into a reactor, while stirring thereof, adding a cross-linking agent 0.05 part by weight to 0.3 part by weight thereto, based on the conjugated diene monomer 100 parts by weight, and then subjecting thereof to a first polymerization (Step 1);

a step of adding the balance of the conjugated diene-based monomer, the emulsifier 0 to 0.1 part by weight and the cross-linking agent 0 to 0.2 part by weight at the time point that polymerization conversion rate of the (Step 1) is 45% to 60%, and then subjecting thereof to a second polymerization (Step 2); and a step of terminating the polymerization at the time point that the polymerization conversion rate of the (Step 2) is 90% to 95% or higher (Step 3).

Further, another embodiment of the present invention provides large-size diene-based rubber latex prepared by the method and having average particle diameter of 2,500 Å to 4,000 Å and gel content of 60% to 80%.

Further, further another embodiment of the present invention provides an acrylonitrile-butadiene-styrene graft copolymer comprising: the diene-based rubber latex 40 wt % to 70 wt %, an aromatic vinyl compound 20 wt % to 50 wt %, and a vinyl cyanide compound 10 wt % to 40 wt % in the total copolymer content.

Further, the present invention provides an acrylonitrile-butadiene-styrene graft thermoplastic resin comprising the acrylonitrile-butadiene-styrene graft copolymer.

Advantageous Effects

The present invention can prepare an acrylonitrile-butadiene-styrene graft copolymer having excellent impact strength, gloss and flexibility by embodying large-size diene-based rubber latex having low gel content and using thereof. Further, it has an advantage of increasing polymerization conversion rate of the final polymer by effectively controlling reaction conditions, thereby increasing industrial productivity.

BEST MODE FOR CARRYING OUT THE INVENTION

Hereinafter, the present invention will be described in more detail in order to help the understanding of the present invention.

In this case, it should be understood that the terms or words used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The present invention provides, in the preparation of diene-based rubber latex applied to ABS resin, a method for preparing a diene-based rubber latex comprising:

a step of adding a conjugated diene-based monomer 50 parts by weight to 75 parts by weight, an emulsifier 1 part by weight to 3 parts by weight, a polymerization initiator 0.1 part by weight to 0.4 part by weight, an electrolyte 0.1 part by weight to 3 parts by weight, a molecular weight control agent 0.1 part by weight to 0.5 part by weight and ion exchanged water 65 parts by weight to 100 parts by weight, based on the conjugated diene monomer 100 parts by weight, into a reactor, while stirring thereof, adding a cross-linking agent 0.05 part by weight to 0.3 part by weight thereto, based on the conjugated diene monomer 100 parts by weight, and then subjecting thereof to a first polymerization (Step 1);

a step of adding the balance of the conjugated diene-based monomer, the emulsifier 0 to 0.1 part by weight and the cross-linking agent 0 to 0.2 part by weight at the time point that polymerization conversion rate of the (Step 1) is 45% to 60%, and then subjecting thereof to a second polymerization (Step 2); and a step of terminating the polymerization at the time point that the polymerization conversion rate of the (Step 2) is 90% to 95% or higher (Step 3).

The (Step 1) is a step of mixing the conjugated diene-based monomer, the emulsifier and the molecular weight control agent and initiating the polymerization by firstly adding the conjugated diene-based monomer 50 parts by weight to 75 parts by weight, the emulsifier 1 part by weight to 3 parts by weight, the polymerization initiator 0.1 part by weight to 0.4 part by weight, the electrolyte 0.1 part by weight to 3 parts by weight, the molecular weight control agent 0.1 part by weight to 0.5 part by weight, and the ion exchanged water 65 parts by weight to 100 parts by weight into the reactor, and then adding the cross-linking agent 0.05 part by weight to 0.3 part by weight for the first polymerization.

In the present invention, the conjugated diene-based monomer may be composed of only a conjugated diene-based monomer, or composed of the conjugated diene-based monomer with an aromatic vinyl-based monomer and a vinyl cyanide-based monomer. Namely, the conjugated diene-based monomer may mean a conjugated diene-based monomer, or a monomer of the conjugated diene-based monomer, the aromatic vinyl-based monomer and the vinyl cyanide-based monomer.

In the case that the conjugated diene-based monomer is the mixture of the monomers, the conjugated diene-based monomer may comprise the conjugated diene-based monomer 80 wt % to 99 wt %; and at least one co-monomer selected from the group consisting of the aromatic vinyl-based monomer and the vinyl cyanide-based monomer 1 wt % to 20 wt %.

At this time, the conjugated diene-based monomer may comprise a single material or at least two compounds selected from the group consisting of 1,3-butadiene, isoprene, chloroprene and piperylene, and specifically, it may be 1,3-butadiene.

Further, the aromatic vinyl-based monomer may comprise a single material or at least two compounds selected from the group consisting of styrene, α-methyl styrene, m-methyl styrene, α-ethyl styrene p-methyl styrene and p-tert-butyl styrene, and specifically, it may be styrene.

Further, the vinyl cyanide-based monomer may comprise a single material or at least two compounds selected from the group consisting of acrylonitrile, methacrylonitrile, ethacrylonitrile and isopropyl acrylonitrile, and specifically, it may be acrylonitrile.

At least one selected from the group consisting of acrylate-based compounds such as methyl methacrylate, ethyl methacrylate, n-propyl methacrylate, i-propyl methacrylate, n-butyl methacrylate, 2-ethyl hexyl acrylate and the like may be additionally mixed to the conjugated diene-based monomer mixture.

In the (Step 1), the conjugated diene monomer 50 parts by weight to 75 parts by weight of the total use amount of the conjugated diene monomer used for preparing the large-size rubber latex was used. If the content is less than 50 parts by weight, it may be difficult to obtain high conversion rate and high gel content in a short time, and if it is greater than 75 parts by weight, it may be difficult to control reaction temperature due to too fast reaction speed, and a problem of impact strength reduction may be caused when preparing an impact resistant resin using the same.

In the (Step 1), the emulsifier may be a general anionic adsorptive emulsifier, a nonionic emulsifier, a reactive emulsifier or a polymer-type reactive emulsifier and the like alone or in combination, but not particularly limited thereto, and its representative examples may comprise a single material selected from the group consisting of alkyl aryl sulfonate, alkali methyl alkyl sulfonate, sulfonated alkyl ester, saponified fatty acid, alkali salt of oleic acid, alkali salt of stearic acid and alkali salt of rosin acid, or a mixture thereof.

In the (Step 1), if the content of the emulsifier is less than 1 part by weight, there may be disadvantages that the conversion rate becomes very slow, and rubber latex stability is decreased. If it is greater than 3 parts by weight, there may be disadvantages that temperature control is decreased due to too fast reaction speed, rubber latex stability is decreased due to high viscosity, and particle size is reduced.

Further, the polymerization initiator may be a water-soluble polymerization initiator, a lipid-soluble polymerization initiator or an oxidation-reduction catalyst and the like alone or in combination, but not particularly limited thereto. And as its representative examples, the water-soluble polymerization initiator may be at least one persulfate selected from the group consisting of potassium persulfate, sodium persulfate and ammonium persulfate, the lipid-soluble polymerization initiator may be selected from the group consisting of cumene hydroperoxide, diisopropyl benzene hydroperoxide, azobis isobutyronitrile, tertiary butyl hydroperoxide, paramethane hydroperoxide and benzoylperoxide, and the oxidation-reduction catalyst may be selected from the group consisting of sodium formaldehyde, sulfoxylate, sodium ethylenediamine tetraacetate, ferrous sulfate, dextrose, sodium pyrophosphate and sodium sulfite.

If the content of the polymerization initiator is less than 0.1 part by weight, there may be a problem that the initial reaction is delayed. If it is greater than 0.4 part by weight, there may be problems that polymerization heat control and particle size control are difficult due to excess initial reaction.

The electrolyte may be a single material selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$, K$_2$HPO$_4$, and Na$_2$HPO$_4$, or a mixture thereof.

In the (Step 1), if the content of the electrolyte is less than 0.1 part by weight, there may be problem on maintaining rubber latex stability by decreased large-size particle formation and increased viscosity during reaction. If it is greater than 3 parts by weight, there may be a problem of decrease of reaction speed due to the reduced initial particle number.

The molecular weight control agent is not particularly limited, and for example, it may be mercaptans such as a-methyl styrene dimer, t-dodecyl mercaptan, n-dodecyl mercaptan and octyl mercaptan, halogenated hydrocarbon such as carbon tetrachloride, methylene chloride and methylene bromide, and sulfur-containing compounds such as tetraethyl thiuram disulfide, dipentamethylene thiuram disulfide and diisopropylxanthogen disulfide. Preferably, it may be t-dodecyl mercaptan.

In particular, in the (Step 1) of the method of the present invention, the cross-linking agent is an oligomer having small number average molecular weight (Mn), and its representative example may be (propylene glycol)$_n$ diacrylate (wherein, n is an integer of 3 to 15), and specifically, it may be (propylene glycol)$_7$ diacrylate or (propylene glycol)$_{13}$ diacrylate having number average molecular weight of 500 to 800. In this case, if the n is greater than 15, impact strength may be improved, but there may be a disadvantage of decrease of rubber latex stability.

Further, if the content of the cross-linking agent is 0.05 part by weight or less, impact strength improving effect may be not large or little, and if it is more than 0.3 part by weight, there is a defect of decrease of rubber latex stability.

In particular, in the present invention, an effect on increasing polymerization speed can be obtained by adding the acrylate-based cross-linking agent at the beginning of the polymerization reaction and then reacting thereof.

Further, in the method of the present invention, the (Step 2) is a step of adding the balance of the conjugated diene-based monomer, the emulsifier 0 part by weight to 0.1 part by weight and the cross-linking agent 0 part by weight to 0.2 part by weight at the time point that the polymerization conversion rate of the first polymerization is 45% to 60% and subjecting thereof to the second polymerization.

In the method of the present invention, in conducting the polymerization reaction of the (Step 2), the cross-linking agent may be used, or not used, but it is more preferred to use it for additional impact strength improvement. Further, the kinds cross-linking agents to be used in the (Step 1) and the (Step 2) may be the same kind or different each other.

The total content of the cross-linking agent used for preparing the diene-based rubber latex of the present invention may preferably be 0.05 to 0.5 part by weight based on the total content of the conjugated diene compound monomer. If the total content of the cross-linking agent is less than 0.05 part by weight, the impact strength improving effect may be not large, and if it is greater than 0.5 part by weight, it may cause decrease of rubber latex stability.

Further, in the preparation method according to the present invention, as described above, large-size rubber latex having low gel content and proper particle diameter can be easily formed by adding the conjugated diene-based monomer, the emulsifier and the cross-linking agent in two steps according to the time point of polymerization conversion rate.

On the other hand, the first polymerization step and the second polymerization step according to the present invention may be conducted under different temperature conditions, respectively.

Specifically, the first polymerization step may be conducted under a temperature condition of 60° C. to 75° C., and the second polymerization step may be conducted under a temperature condition of 75° C. to 88° C. Namely, in the present invention, the polymerization may be conducted by gradually increasing the temperature condition as the polymerization progresses.

The (Step 3) is a step terminating the polymerization at the time point of the polymerization conversion rate of 90% to 95% to obtain the rubber polymer latex.

The step of terminating the polymerization may be commonly conducted by lowering temperature, or may be conducted by a common method known in the art, for example, by using a known polymerization inhibitor.

Further, the present invention provides a diene-based rubber latex prepared by the preparation method.

The diene-based rubber polymer according to one embodiment of the present invention may have average particle diameter of 2,500 Å to 4,000 Å, solid (gel) content of 80% or less, specifically, 60% to 80%, and swelling index of 15 to 25.

Herein, the Å is a unit of length used to represent wavelength of an electromagnetic radiation, and 1 Å is equal to 0.1 nm.

The solid (gel) content represents degree of cross-link in a polymer, i.e., degree of cross-linking of a polymer, and lower solid (gel) content value means higher impact strength.

The swelling index represents degree of swelling of a polymer by a solvent, and as the degree of cross-linking of a polymer is higher, the swelling index may be lower.

Moreover, the present invention provides an acrylonitrile-butadiene-styrene copolymer comprising the diene-based rubber polymer.

In this case, the acrylonitrile-butadiene-styrene copolymer is characterized by comprising the diene-based rubber latex 40 wt % to 70 wt %, the aromatic vinyl compound 20 wt % to 50 wt %, and the vinyl cyanide compound 10 wt % to 40 wt % in the total copolymer content.

The total content of the solid used for preparing the acrylonitrile-butadiene-styrene copolymer, i.e., the diene-based rubber latex prepared by the method of the present invention is 40 wt % to 70 wt %. If the total content of the rubber latex is lower than 40 wt %, impact strength improving effect may be not large, and if it is greater than 70 wt %, latex stability may be decreased.

Specifically, the acrylonitrile-butadiene-styrene copolymer may have polymerization conversion rate of 90% to 99%, graft rate of 25% to 35%, and formed coagulate content of 0.01% to 0.1%, and more specifically, the copolymer may have the polymerization conversion rate of 97%, the graft rate of 33%, and the formed coagulate content of 0.05%.

On the other hand, according to the present invention, the acrylonitrile-butadiene-styrene copolymer can be prepared by a common method known in the art without particular limitation, and for example, it may be prepared by adding additives such as the aromatic vinyl compound, the vinyl cyanide compound and the emulsifier to the diene-based rubber polymer, subjecting thereof to emulsion polymerization, and then coagulating and washing thereof. In this case, each of components can be involved in the reaction by a method of simultaneously adding the components to the reactor, a method of continuously adding thereof or a method of firstly adding a part of the components and then adding the rest of them after initiating polymerization.

Further, in order to easily achieving the emulsion polymerization, as occasion demands, an additive such as a chelating agent, a dispersing agent, a pH adjusting agent, an oxygen absorber, a particle diameter control agent, an antioxidant and an oxygen scavenger can be additionally added, and the emulsion polymerization may be commonly conducted at a temperature range from 10° C. to 90° C., and preferably at a temperature range from 25° C. to 75° C.

Further, the coagulation is to form acrylonitrile-butadiene-styrene copolymer latex coagulates by coagulating the acrylonitrile-butadiene-styrene copolymer latex composition formed after the emulsion polymerization, and it can be conducted by a common method known in the art, for example by treating aqueous base solution or aqueous acid solution to the composition and then subjecting thereof to base coagulation or acid coagulation.

The washing is to obtain the acrylonitrile-butadiene-styrene copolymer by removing impurities (residual emulsifier, coagulating agent and the like) from the acrylonitrile-butadiene-styrene copolymer latex coagulates formed by the base coagulation or the acid coagulation, and it may be conducted by adding the coagulates to aqueous inorganic salt solution and then washing and drying thereof.

In this case, the washing and the drying may be conducted by a common method known in the art without particular limitation.

During the graft polymerization of the present invention, the monomer can be added continuously or simultaneously, and optionally, the continuous addition method and the simultaneous addition method can be used in combination. In the present invention, it is not particularly limited, and preferably, the continuous addition is effective to cell graft reaction, and in some cases, 5% to 20% of the total monomer can be added simultaneously at the beginning stage of the reaction and rest of them can be continuously added. In this case, the monomer added at the beginning of the reaction may be independently added preferably, and the monomer added at the later stage of the reaction may be added in the form of emulsified monomer containing an emulsifier, water and an initiator. The graft polymerization time may preferably be 2 hours to 4 hours, and the polymerization conversion rate after the reaction may preferably be 98.5% or higher, and molecular weight of the prepared graft rubber latex may preferably be 50,000 to 150,000.

Further, the present invention provides an acrylonitrile-butadiene-styrene-based thermoplastic resin comprising the acrylonitrile-butadiene-styrene graft copolymer 20 wt % to 50 wt % and styrene-acrylonitrile copolymer 50 wt % to 80 wt %.

MODE FOR CARRYING OUT THE INVENTION

Hereinafter, the present invention will be described in more detail, according to the following Examples and Test Examples. However, the following Examples and Test Examples are merely presented to exemplify the present invention, and the scope of the present invention is not limited thereto.

EXAMPLE

Example 1

(Preparation of Rubber Latex)

Ion exchanged water 65 parts by weight, as a monomer, 1,3-butadiene 75 parts by weight, as an emulsifier, potassium rosinate 1 part by weight and potassium oleate 1.5 parts by weight, as an electrolyte, potassium carbonate ($K_2CO_3$) 0.3 part by weight, as a molecular weight control agent, tertiary dodecyl mercaptan (TDDM) 0.3 part by weight, as an initiator, potassium persulfate ($K_2S_2O_8$) 0.3 part by weight were simultaneously added into a nitrogen-substituted polymerization reactor (Autoclave). As a cross-linking agent, (propylene glycol)$_7$ diacrylate 0.2 part by weight was added thereto, and then reacted at a reaction temperature of 70° C. until polymerization conversion rate reached 40% (First polymerization). Then, the balance of the 1,3-butadiene and potassium rosinate 0.3 part by weight were dividedly added thereinto, heated to 82° C. and then reacted (Second polymerization). Then, the reaction was terminated when polymerization conversion rate reached 93% to obtain rubber latex having gel content of 78% and large size of 3100 Å.

(Preparation of Acrylonitrile-Butadiene-Styrene Copolymer)

The diene-based rubber polymer prepared in the above 60 parts by weight and ion exchanged 100 parts by weight were added to a nitrogen-substituted polymerization reactor, a mixed solution consisting of acrylonitrile 10 parts by weight, styrene 30 parts by weight, ion exchanged water 25 parts by weight, t-butyl hydroperoxide 0.12 part by weight, potassium rosinate 1.0 part by weight and tertiary dodecyl mercaptan 0.3 part by weight, which was mixed in a separate blending apparatus, was continuously added into the polymerization reactor at 70° C. for 3 hours with dextrose 0.054 part by weight, sodium pyrophosphate 0.004 part by weight and ferrous sulfate 0.002 part by weight. After terminating the continuous addition, dextrose 0.05 part by weight, sodium pyrophosphate 0.03 part by weight, ferrous sulfate 0.001 part by weight and t-butyl hydroperoxide 0.05 part by weight were simultaneously added into the polymerization reactor, the temperature was raised for 1 hour up to 80° C., and then the reaction was terminated to prepare acrylonitrile-butadiene-styrene copolymer latex (polymerization conversion rate was 97%, graft rate of the prepared ABS copolymer was 41%, and the formed coagulates content was 0.3%). The formed acrylonitrile-butadiene-styrene copolymer latex was coagulated with aqueous sulfuric acid, washed and then dried to obtain an acrylonitrile-butadiene-styrene copolymer powder. Properties of the obtained rubber latex were measured and the results were shown in the following Table 1.

(Acrylonitrile-Butadiene-Styrene-Based Thermoplastic Resin)

The acrylonitrile-butadiene-styrene graft copolymer powder 22.5 wt % and styrene-acrylonitrile-based resin (LG SAN 92 HR) 77.5 wt % were mixed and pelleted using an extruder, and a specimen of acrylonitrile-butadiene-styrene-based thermoplastic resin was obtained by using an injection molding machine. Properties of the specimen, such as impact strength, flexibility and gloss, were measured, and the results were shown in the following Table 2 and comparatively analyzed. In this case, each pellet was prepared as a specimen with thickness of ¼ inch, and then the impact strength was measured according to ASTM D256.

Example 2

(Preparation of Rubber Latex)

The procedure of Example 1 was repeated except for using (propylene glycol)$_{13}$ diacrylate instead of the (propylene glycol)$_7$ diacrylate as a cross-linking agent to obtain rubber latex having gel content of 76% and large size of 3100 Å.

(Preparation of Acrylonitrile-Butadiene-Styrene Copolymer)

The procedure of Example 1 was repeated except for using the rubber latex prepared above instead of the rubber latex prepared in Example 1 to obtain acrylonitrile-butadiene-styrene copolymer powder, and a specimen was prepared using the same. Properties of the specimen were measured, the results were shown in the following Table 1, and then the values were comparatively analyzed.

(Acrylonitrile-Butadiene-Styrene-Based Thermoplastic Resin)

The acrylonitrile-butadiene-styrene graft copolymer powder 22.5 wt % and styrene-acrylonitrile-based resin (LG SAN 92 HR) 77.5 wt % were mixed and pelleted using an extruder, and a specimen of acrylonitrile-butadiene-styrene-based thermoplastic resin was obtained by using an injection molding machine. Properties of the specimen, such as impact strength, flexibility and gloss, were measured, and the results were shown in the following Table 2.

Example 3

(Preparation of Rubber Latex)

Ion exchanged water 65 parts by weight, as a monomer, 1,3-butadiene 75 parts by weight, as an emulsifier, potassium rosinate 1.0 part by weight and potassium oleate 1.5 parts by weight, as an electrolyte, potassium carbonate (K$_2$CO$_3$) 0.3 part by weight, as a molecular weight control agent, tertiary dodecyl mercaptan (TDDM) 0.3 part by weight, as an initiator, potassium persulfate (K$_2$S$_2$O$_8$) 0.3 part by weight were simultaneously added into a nitrogen-substituted polymerization reactor (Autoclave). As a cross-linking agent, (propylene glycol)$_{13}$ diacrylate 0.2 part by weight was added thereto, and then reacted at a reaction temperature of 70° C. until polymerization conversion rate reached 40% (First polymerization). Then, the balance of the 1,3-butadiene, potassium rosinate 0.3 part by weight and (propylene glycol)$_{13}$ diacrylate 0.1 part by weight as a cross-linking agent were continuously dividedly added thereinto, heated to 82° C. and then reacted (Second polymerization). Then, the reaction was terminated by lowering temperature when polymerization conversion rate reached 93% to obtain rubber latex having gel content of 70% and large size of 3100 Å.

(Preparation of Acrylonitrile-Butadiene-Styrene Copolymer)

The procedure of Example 1 was repeated except for using the rubber latex prepared above instead of the rubber latex prepared in Example 1 to obtain acrylonitrile-butadiene-styrene copolymer powder, and a specimen was prepared using the same. Properties of the specimen were measured, the results were shown in the following Table 1, and then the values were comparatively analyzed.

(Acrylonitrile-Butadiene-Styrene-Based Thermoplastic Resin)

The acrylonitrile-butadiene-styrene graft copolymer powder 22.5 wt % and styrene-acrylonitrile-based resin (LG SAN 92 HR) 77.5 wt % were mixed and pelleted using an extruder, and a specimen of acrylonitrile-butadiene-styrene-based thermoplastic resin was obtained by using an injection molding machine. Properties of the specimen were measured, and the results were shown in the following Table 2.

Comparative Example 1

(Preparation of Rubber Latex: Not Using Cross-Linking Agent)

Ion exchanged water 65 parts by weight, as a monomer, 1,3-butadiene 75 parts by weight, as an emulsifier, potassium rosinate 1.0 part by weight and potassium oleate 1.5 parts by weight, as an electrolyte, potassium carbonate (K$_2$CO$_3$) 0.3 part by weight, as a molecular weight control agent, tertiary dodecyl mercaptan (TDDM) 0.3 part by weight, as an initiator, potassium persulfate (K$_2$S$_2$O$_8$) 0.3 part by weight were added into a nitrogen-substituted polymerization reactor (Autoclave) simultaneously, and then reacted at a reaction temperature of 70° C. until polymerization conversion rate reached 40% (First polymerization). Then, the balance of the 1,3-butadiene was continuously added therein, heated to 82° C., potassium rosinate 0.3 part by weight was dividedly added thereinto when the polymerization conversion rate reached 75%, and then reacted (Second polymerization). Then, the reaction was terminated by lowering temperature when polymerization conversion rate reached 93% to obtain rubber latex.

(Preparation of Acrylonitrile-Butadiene-Styrene Copolymer)

The procedure of Example 1 was repeated except for using the rubber latex prepared above instead of the rubber latex prepared in Example 1 to obtain acrylonitrile-butadiene-styrene copolymer powder, and a specimen was prepared using the same. Properties of the specimen were measured, the results were shown in the following Table 1, and then the values were comparatively analyzed.

(Acrylonitrile-Butadiene-Styrene-Based Thermoplastic Resin)

The acrylonitrile-butadiene-styrene graft copolymer powder 22.5 wt % and styrene-acrylonitrile-based resin (LG SAN 92 HR) 77.5 wt % were mixed and pelleted using an extruder, and a specimen of acrylonitrile-butadiene-styrene-based thermoplastic resin was obtained by using an injection molding machine. Properties of the specimen were measured, and the results were shown in the following Table 2.

Comparative Example 2

(Preparation of Rubber Latex)

The procedure of Comparative Example 1 was repeated except for further using polypropylene glycol diacrylate (Mn=6,000) as a cross-linking agent 0.2 part by weight during the first polymerization to obtain rubber latex having large size of 3100 Å.

(Preparation of Acrylonitrile-Butadiene-Styrene Copolymer)

The procedure of Comparative Example 1 was repeated except for using the rubber latex prepared above instead of the rubber latex prepared in Comparative Example 1 to obtain acrylonitrile-butadiene-styrene copolymer powder, and a specimen was prepared using the same. Properties of the specimen were measured, the results were shown in the following Table 1, and then the values were comparatively analyzed.

(Acrylonitrile-Butadiene-Styrene-Based Thermoplastic Resin)

The acrylonitrile-butadiene-styrene graft copolymer powder 22.5 wt % and styrene-acrylonitrile-based resin (LG SAN 92 HR) 77.5 wt % were mixed and pelleted using an extruder, and a specimen of acrylonitrile-butadiene-styrene-based thermoplastic resin was obtained by using an injection molding machine. Properties of the specimen were measured, and the results were shown in the following Table 2.

TABLE 1

| | Cross-linking agent | Impact strength (Izod 1/4, kg-cm/cm) | Flexibility (g/10 min) | Gloss (%) |
|---|---|---|---|---|
| Example 1 | (propylene glycol)$_7$ diacrylate 0.2 part by weight | 34.5 | 20.1 | 90.2 |
| Example 2 | (propylene glycol)$_{13}$ diacrylate 0.2 part by weight | 35.4 | 20.5 | 91.4 |
| Example 3 | (propylene glycol)$_{13}$ diacrylate 0.2 part by weight/0.1 part by weight | 37.2 | 21.4 | 91.8 |
| Comparative Example 1 | x | 31.3 | 19.5 | 88.5 |
| Comparative Example 2 | Polypropylene glycol diacrylate (Mn = 6,000) 0.2 part by weight | 31.8 | 19.4 | 88.8 |

As shown in the Table 1, in the case of the acrylonitrile-butadiene-styrene copolymers prepared using the rubber latex of the present invention in Examples 1 to 3, it could be found that the impact strength was improved about 15% on average, the flexibility was improved about 6% on average and the gloss was improved about 3% on average, compared to the copolymer of Comparative Example 1 not using the cross-linking agent, and the copolymer of Comparative Example 2 using the rubber latex, which was prepared by using the oligomer cross-linking agent having large number average molecular weight.

TABLE 2

| Section | Impact strength (Izod 1/4, kg-cm) | Flexibility (g/10 min) | Gloss (%) |
|---|---|---|---|
| Example 1 (5% loss of powder) | 31.3 | 23.1 | 93.9 |
| Example 2 (5% loss of powder | 31.5 | 23.8 | 94.4 |
| Example 3 (5% loss of powder | 31.8 | 24.1 | 95.0 |
| Comparative Example 1 (5% loss of powder | 31.3 | 19.5 | 88.5 |
| Comparative Example 2 (5% loss of powder | 27.4 | 21.2 | 91.3 |

Further, as shown in the Table 2, in the case of the acrylonitrile-butadiene-styrene thermoplastic resins of Examples 1 to 3 using the rubber latex of the present invention, it could be confirmed that powder weight in the thermoplastic resins was reduced 5%, but the impact strength was similar with or better than that of Comparative Example 1, the flexibility was improved about 21% on average, and the gloss was improved about 7% on average. In particular, in the case of Examples 2 and 3 using the (propylene glycol)$_{13}$ diacrylate as a cross-linking agent, it could be found that the impact strength was improved about 15% on average, the flexibility was increased about 12% on average, and the gloss was improved about 3% on average, compared to the resin of Comparative Example 2.

The invention claimed is:

1. A method for preparing a diene-based rubber latex comprising:
   preparing a first solution by adding 50 to 75 parts by weight of a conjugated diene-based monomer, 1 part by weight to 3 parts by weight of an emulsifier, 0.1 parts by weight to 0.4 parts by weight of a polymerization initiator, 0.1 parts by weight to 3 parts by weight of an electrolyte, 0.1 parts by weight to 0.5 parts by weight of a molecular weight control agent and 65 parts by weight to 100 parts by weight of ion exchanged water, based on 100 parts by weight of the conjugated diene-based monomer, into a reactor while stirring, adding 0.05 part by weight to 0.3 part by weight of a cross-linking agent based on 100 parts by weight of the conjugated diene-based monomer, and then subjecting the first solution to a first polymerization (Step 1);
   performing a second polymerization by further adding a balance of the conjugated diene-based monomer, 0 to 0.1 parts by weight of the emulsifier and 0 to 0.2 parts by weight of the cross-linking agent (Step 2); and
   terminating the second polymerization when the polymerization conversion rate of the second polymerization is 90% or higher (Step 3), wherein the cross-linking agent is (propylene glycol)n diacrylate, in which n is 7 to 13.

2. The method for preparing the diene-based rubber latex of claim 1, wherein the conjugated diene-based monomer is composed of a single material of a conjugated diene-based monomer.

3. The method for preparing the diene-based rubber latex of claim 1, wherein the conjugated diene-based monomer is a mixture composed of:
- 80 wt % to 99 wt % of a conjugated diene-based co-monomer; and
- 1 wt % to 20 wt % of at least one monomer selected from the group consisting of an aromatic vinyl-based monomer and a vinyl cyanide-based monomer.

4. The method for preparing the diene-based rubber latex of claim 3, wherein the aromatic vinyl-based monomer is one or more material selected from the group consisting of styrene, α-methyl styrene, m-methyl styrene, α-ethyl styrene p-methyl styrene and p-tert-butyl styrene.

5. The method for preparing the diene-based rubber latex of claim 3, wherein the vinyl cyanide-based monomer is one or more material selected from the group consisting of acrylonitrile, methacrylonitrile, ethacrylonitrile and isopropyl acrylonitrile.

6. The method for preparing a diene-based rubber latex of claim 1, wherein the conjugated diene-based monomer is one or more material selected from the group consisting of 1,3-butadiene, isoprene, chloroprene and piperylene.

7. The method for preparing diene-based rubber latex of claim 1, wherein the cross-linking agent is (propylene glycol)$_7$ diacrylate or (propylene glycol)$_{13}$ diacrylate.

8. The method for preparing the diene-based rubber latex of claim 1, wherein the emulsifier is a one or more materials selected from the group consisting of alkyl aryl sulfonate, alkali metal alkyl sulfonate, sulfonated alkyl ester, saponified fatty acid, alkali salt of oleic acid, alkali salt of stearic acid and alkali salt of rosin acid.

9. The method for preparing the diene-based rubber latex of claim 1, wherein the polymerization initiator comprises a water-soluble polymerization initiator, a lipid-soluble polymerization initiator or an oxidation-reduction catalyst.

10. The method for preparing the diene-based rubber latex of claim 9, wherein the water-soluble polymerization initiator is at least one persulfate selected from the group consisting of potassium persulfate, sodium persulfate and ammonium persulfate.

11. The method for preparing the diene-based rubber latex of claim 9, wherein the lipid-soluble polymerization initiator is selected from the group consisting of cumene hydroperoxide, diisopropyl benzene hydroperoxide, azobis isobutyronitrile, tertiary butyl hydroperoxide, paramethane hydroperoxide and benzoylperoxide.

12. The method for preparing the diene-based rubber latex of claim 9, wherein the oxidation-reduction catalyst is selected from the group consisting of sodium formaldehyde, sulfoxylate, sodium ethylenediamine tetraacetate, ferrous sulfate, dextrose, sodium pyrophosphate and sodium sulfite.

13. The method for preparing the diene-based rubber latex of claim 1, wherein the electrolyte is a one or more materials selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$, K$_2$HPO$_4$, and Na$_2$HPO$_4$.

14. The method for preparing the diene-based rubber latex of claim 1, wherein the first polymerization is conducted at a temperature from 60° C. to 75° C.

15. The method for preparing the diene-based rubber latex of claim 1, wherein the second polymerization is conducted at a temperature from 75° C. to 88° C.

16. The method for preparing the diene-based rubber latex of claim 1, wherein the polymerization is terminated by lowering a temperature.

17. A diene-based rubber latex which is prepared by the method of claim 1, and has an average particle diameter of 2,500 Å to 4,000 Å.

18. The diene-based rubber latex of claim 17, wherein the diene-based rubber latex has a gel content of 60% to 80%.

19. The diene-based rubber latex of claim 17, wherein the diene-based rubber latex has a swelling index of 15 to 25.

* * * * *